Feb. 19, 1935. H. T. SIDWAY 1,992,098
BERRY BOX
Filed March 22, 1933
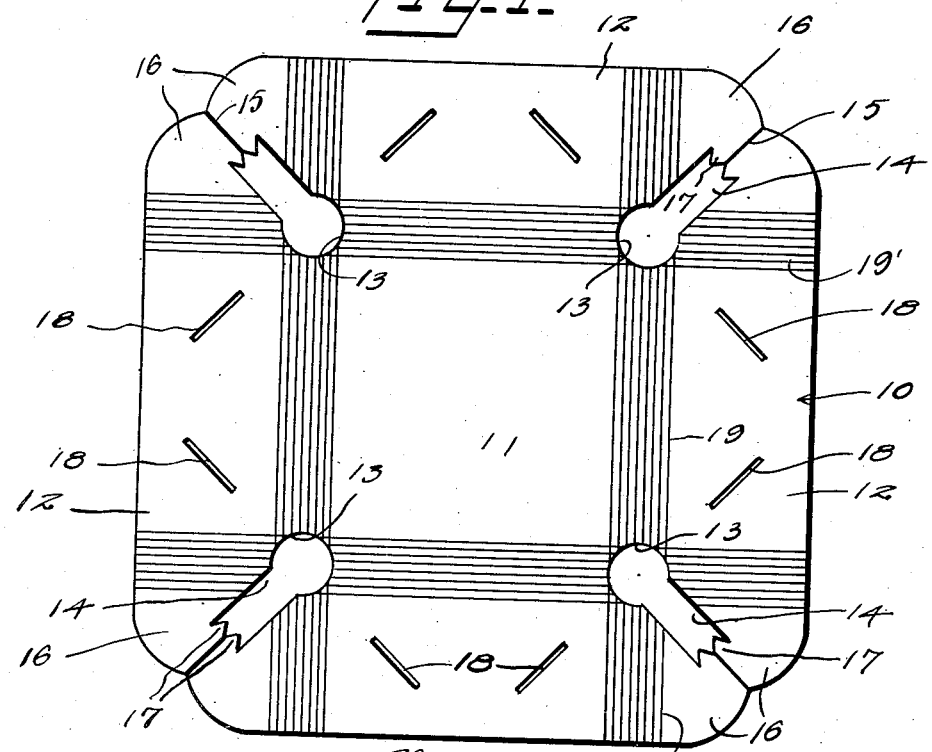
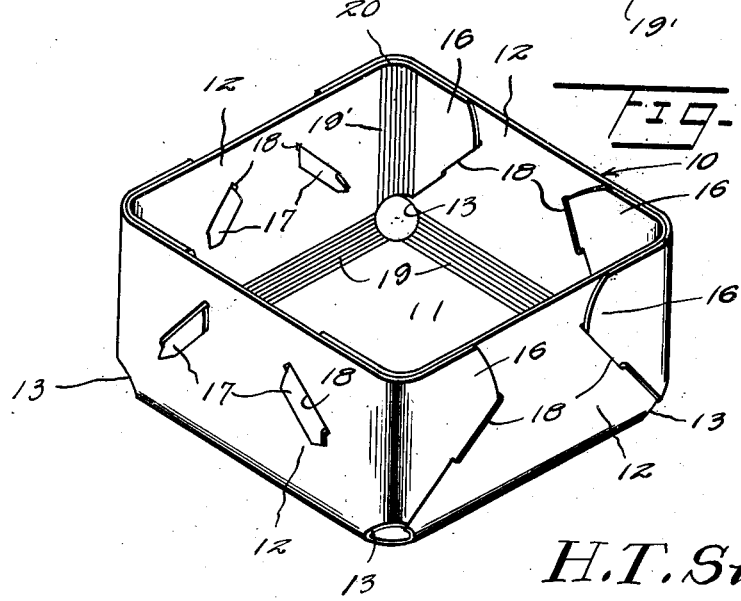
Inventor
H. T. Sidway
By Watson E. Coleman
Attorney Patented Feb. 19, 1935

1,992,098

UNITED STATES PATENT OFFICE 1,992,098

BERRY BOX

Henry T. Sidway, Tampa, Fla.

Application March 22, 1933, Serial No. 662,130

2 Claims. (Cl. 229—35)

This invention relates to containers and more particularly to a container adapted for use in the shipment and the handling of fruit or the like.

An object of this invention is to provide a container which is so constructed that it can be made out of a blank sheet of material such as wood, boxboard or the like, thereby permitting the manufacturer of the container to ship the containers in unassembled form.

Another object of this invention is to provide a container of this type which can be readily assembled and when assembled will provide a container of suitable capacity for holding fruit which, when in the container, will be so held that the fruit, particularly at the junction of the side or vertical walls with the bottom and one side wall with another, will not distort or injure the fruit within the container as is the case where boxes or containers are used with square corners and joints between the sides and bottom.

A further object of this invention is to provide a container of this type which, when assembled, will provide a suitable ventilating means to ventilate the fruit in the box or container.

A still further object of this invention is to provide a container of this type which can be put together without the use of forms and which will hold the fruit in a sanitary manner so that the fruit will not be damaged and subject to decay or undue deterioration in the shipment or handling thereof.

Another object of this invention is to provide a container of this type which is exceedingly simple in construction so that when the blank or unassembled container is received by the fruit grower or shipper, it may be easily and quickly assembled.

A further object of this invention is to provide a container of this type which is so constructed that when a plurality of boxes or containers are placed in a crate, the boxes can be easily and quickly withdrawn.

The above and various other objects and advantages of this invention will in part be described and in part be understood from the following detailed description of the present preferred embodiment, the same being illustrated in the accompanying drawing wherein:—

Figure 1 is a plan view of a container constructed according to the preferred embodiment of this invention in blank or unassembled form.

Figure 2 is a detail perspective view of the assembled container.

Referring to the drawing wherein like numerals of reference designate corresponding parts throughout the views, the numeral 10 designates generally a container or box constructed according to the preferred embodiment of this invention which is constructed in substantially rectangular or square form and which has a bottom 11 and sides 12.

Referring to Figure 1 of the drawing wherein there is disclosed a blank from which the container or box shown in Figure 2 is constructed, the side walls 12 and the bottom 11 are constructed from a sheet of material of substantially square or rectangular form, which material is provided adjacent the corners thereof with substantially round or circular openings 13 and an elongated slot 14.

A slit 15 is provided in the sheet of material extending to each corner from the end of the slot 14, and this slit divides confronting tongues or securing members 16. There are two tongues 16, one at each end of each side wall 12, and the tongues 16 have a hook 17 which is adapted to engage in an elongated slot 18 provided in an adjacent side wall. Each side wall 12 has two slits or openings 18 to receive the tongues and hook portions 17 of the adjacent side walls.

The sheet of material from which the box or container is constructed is provided adjacent the juncture of an edge of the bottom 11 with an edge of a side 12 with a plurality of spaced scores 19, which scores 19 extend to the opposite sides or edges of the blank, being continued beyond the edge of the bottom 11 through the side wall 12 and the tongue or overlapping member 16. These scores 19 are provided along each edge of the bottom 11 and also along the confronting edges of the side 12, so that the blank is scored longitudinally and transversely. These scores 19 are disposed preferably on the inner face or side of the container so that when the sides 12 are bent upwardly, the meeting edge between the sides 12 and the bottom 11 will be a curved portion which curved portion has a sufficient radius so that the fruit, such as berries or the like, disposed in the box and engaging the corners and meeting edges of the sides and bottom will not be distorted when packed relatively tight. The continuations 19' of the scores 19, which extend through the sides 12 and the tongues 16 provide means by which curved corners 20 may be provided and the curvature of the corners 20 is similar to the curvature of the joint between the sides 12 and the bottom 11. The round opening 13 which is made in the blank form at each corner of the bottom 11 provides holes at each corner of the box so that air can readily enter the inside of the box and thereby ventilate the fruit disposed in the box. By providing the scores 19 in both the sides 12 and the bottom 11, the box can be readily assembled without the use of a form or die and can be assembled by a person unskilled in the art. The slots 18 are disposed on the desired angle in the sides 12 so that the box, when in assembled form, may have the sides 12 either at right angles to the bottom 11 or at any other desired angle.

By providing curved corners such as 20 in the box, there will be a space between adjacent boxes when packed closely in a crate, so that the fingers may be extended into this space for withdrawing a desired box without spilling of the contents or without disturbing the other boxes in the crate.

In the use of the box herein disclosed, the manufacturer will initially cut the blank and assemble the containers in flat form, in which form they will be shipped to the fruit grower or shipper of the fruit. At this point, the boxes can be assembled by bending the sides 12 upwardly and the tongues 16 around the corners and engaging the hooks or bills 17 in the slot 18 of an adjacent side wall 12.

While I have shown the box as being constructed out of boxboard or composition material which will readily bend by the use of the scores 19 and 19' and have shown tongues 16 provided with securing members or bills 17, I do not wish to be limited to this particular type of box or material as the side walls 12 may be secured together by other suitable and conventional means, this being true where the box is made out of veneer or the like.

It is to be understood that the term "boxboard" as used both in the description and claims, is intended to cover paper board of desired gauge and quality as well as any other board or sheet which can be used.

What is claimed is:—

1. A boxboard box comprising integral bottom and sides, means for securing the sides together in upstanding position, a plurality of scores carried by the bottom in parallel relation to each other and along each marginal edge thereof, a plurality of scores carried by each side adjacent to and parallel with the bottom scores and co-operating with the bottom scores to form a curved joint between the bottom and sides, said scores in the bottom and the sides being disposed on the inside of the box, and a plurality of scores carried by the sides at each end thereof to form curved joints between adjacent sides, the curvature between adjacent sides and between the sides and bottom being substantially equivalent to the curvature of a normal sized berry.

2. A boxboard box comprising integral bottom and sides, scores carried by the bottom along each marginal edge thereof, said scores being disposed in parallel relation to the adjacent sides and extending in spaced relation to each other inwardly of the adjacent sides, scores carried by the sides in parallel relation to the bottom scores and extending outwardly thereof and cooperating with the bottom scores to form a curved joint between the bottom and the sides, a tongue integral with each end of each side, a hook carried by each tongue, a slot carried by each side adjacent each end thereof for engagement by a hook to hold the sides in upstanding relation and scores carried by the sides and each tongue to form a curved joint between adjacent sides, the curvature between adjacent sides and between the sides and bottom being substantially equivalent to the curvature of a normal sized berry.

HENRY T. SIDWAY.